United States Patent [19]
Laurent et al.

[11] 3,921,643
[45] Nov. 25, 1975

[54] COMB DEVICE FOR CLEANING GRAIN BEFORE IT PASSES INTO THE CLEANING-SHOE OF A COMBINE-HARVESTER

[75] Inventors: Michel Armand Laurent, Villeneuve d'Asq; Daniel Claude Barbieux, Roubaix, both of France

[73] Assignee: International Harvester Company, Chicago, Ill.

[22] Filed: July 11, 1974

[21] Appl. No.: 487,488

[30] Foreign Application Priority Data
July 11, 1973 France.............................. 73.25397

[52] U.S. Cl. ................................................ 130/24
[51] Int. Cl.² .......................................... A01F 12/30
[58] Field of Search ................. 130/24, 26; 209/396

[56] References Cited
UNITED STATES PATENTS
| | | | |
|---|---|---|---|
| 689,801 | 12/1901 | Hawes................................... | 130/24 |
| 2,732,941 | 1/1956 | Deiss................................. | 130/24 X |
| 3,109,433 | 11/1963 | Claas ................................... | 130/24 |

Primary Examiner—J. N. Eskovitz
Attorney, Agent, or Firm—F. David AuBuchon; Floyd B. Harman

[57] ABSTRACT

A grain cleaning device with movable teeth forming a comb which is attached to the shaker table by means of supporting and guiding components which permit displacement of said comb in a transverse direction with respect to the shaker table under the action of control means attached to the frame in which the shaker table is mounted.

8 Claims, 9 Drawing Figures

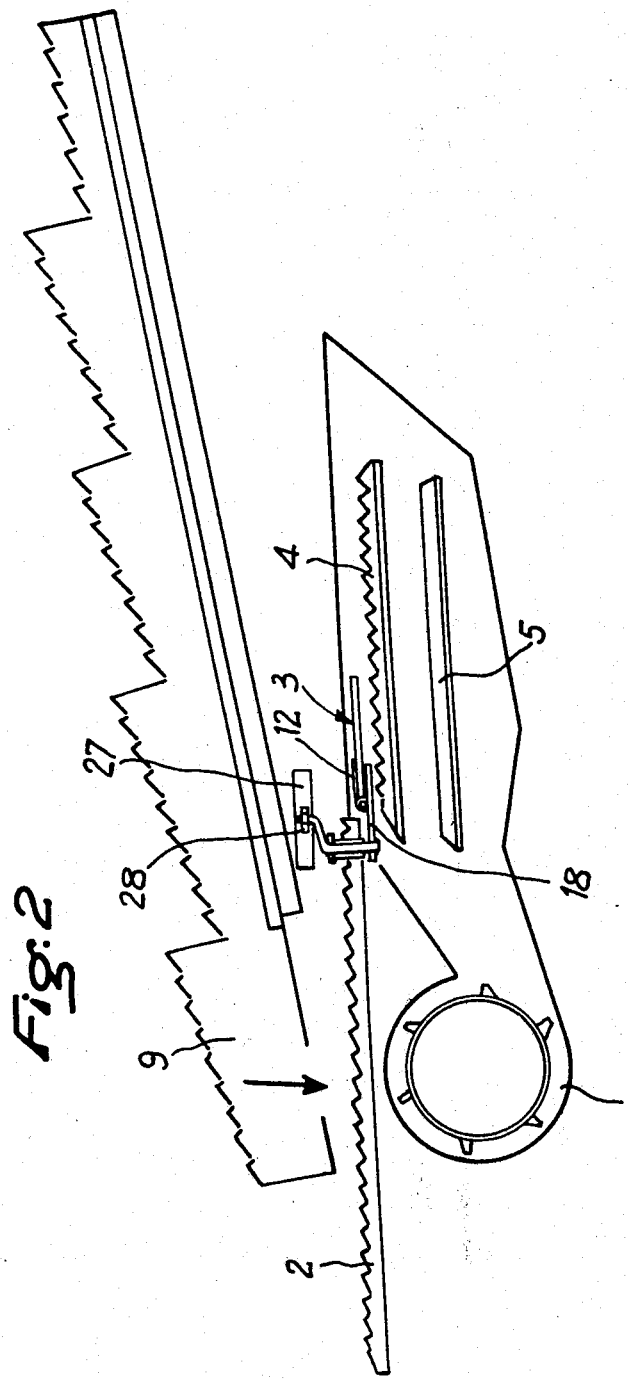
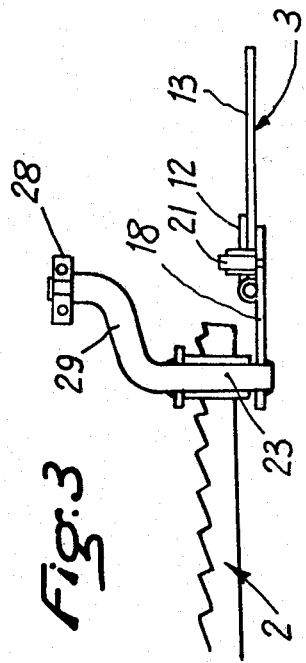
Fig. 2
Fig. 3

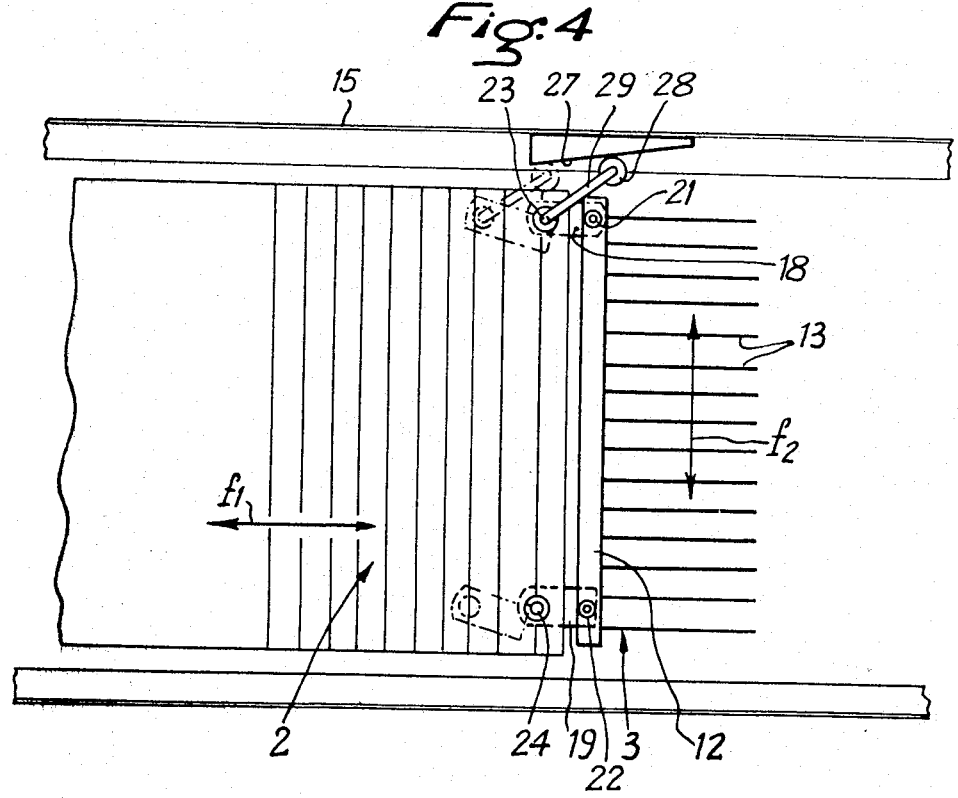
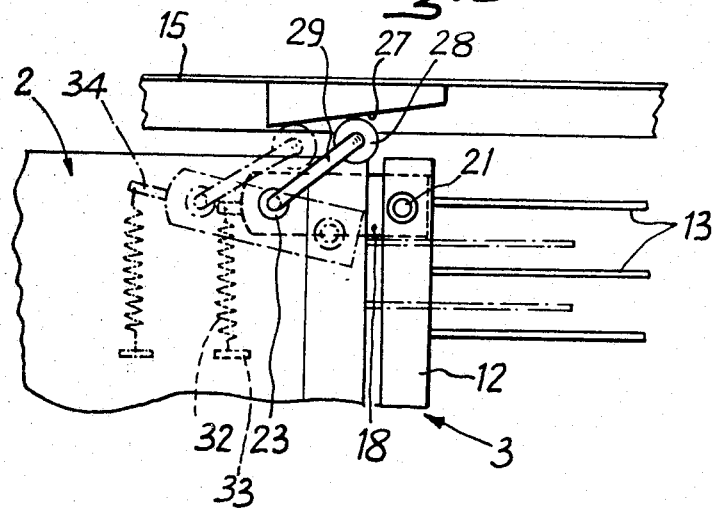

COMB DEVICE FOR CLEANING GRAIN BEFORE IT PASSES INTO THE CLEANING-SHOE OF A COMBINE-HARVESTER

This invention relates to the cleaning of grain, namely to the separation of grain from chaff before passing into the cleaning shoe of a combine-harvester.

In order to improve this separation process, recourse has already been had to rack extensions or combs rigidly fixed to the rear end of the shaker shoe or table of a combine-harvester. This device has been even further improved by subjecting the teeth of the comb which are capable of individual motion to a pivotal movement about the tooth-ends which are attached to the comb body. The improvement obtained in the cleaning of the grain is due to the fact that both the grain and the chaff are subjected not only to a longitudinal movement when they pass over the shaker table but also to a reciprocating movement in contact with the comb teeth.

However, a further disadvantage of devices of this type lies in the fact that the travel of the comb teeth is of maximum value at the free ends of these latter but is of zero value at the points of pivotal attachment of the teeth to the comb body, with the result that the grain is not subjected to any shaking action in the region of the roots of the comb teeth.

The aim of this invention is to provide a cleaning device with movable teeth which is not attended by the above-mentioned disadvantages of known devices.

To this end and in accordance with the invention, the movable teeth form a comb which is attached to the shaker table by means of supporting and guiding components which permit displacement of said comb in a transverse direction with respect to the shaker table under the action of control means attached to the frame in which the shaker table is mounted.

By virtue of this particular structure, all the teeth are driven in transverse translational motion of equal amplitude and the grains which are present in the region of the roots of the comb teeth are subjected to a shaking action which is as powerful as the shaking action exerted on the grains located in the zone of the tooth extremities. In other words, the shaking efficiency of the teeth is the same over the entire length.

In one embodiment, the components for supporting and guiding the comb are constituted by link-arms pivotally mounted at one extremity on the comb body and at the other extremity beneath the rear end of the shaker table whereas, in another embodiment, said comb-supporting and guiding components are constituted by a transverse guide which is rigidly fixed to the rear edge of the shaker table and on which the comb body is slidably mounted.

In one particular form of construction, the combactuating means are constituted by a lateral cam rigidly fixed to the frame in which the shaker table is mounted and also by a roller which runs along said cam and the axle-pin of which is coupled to the comb whereas, in another form of construction, the comb-actuating means are constituted by an elbowed lever so arranged that the apex of said lever is pivotally mounted on the shaker table and the two lever extremities are attached respectively to the comb body and to the frame in which the shaker table is mounted.

A better understanding of the invention will be gained from a perusal of the following description and from a study of the accompanying drawings in which a few forms of construction of a device provided with a grain-cleaning comb in accordance with the invention are shown by way of example without any limitation being implied, and in which:

FIG. 2 is a view in elevation to a larger scale illustrating that portion of the combine which comprises the cleaning comb as shown in FIG. 1;

FIG. 3 is a view to an even larger scale showing the components for supporting and actuating the comb;

FIG. 4 is an overhead plan view to a larger scale showing the rear portion of the shaker table and the comb which are visible in FIG. 2;

FIG. 5 is a view to a larger scale showing the mechanism of the actuating system shown in FIG. 4;

Figure 1:
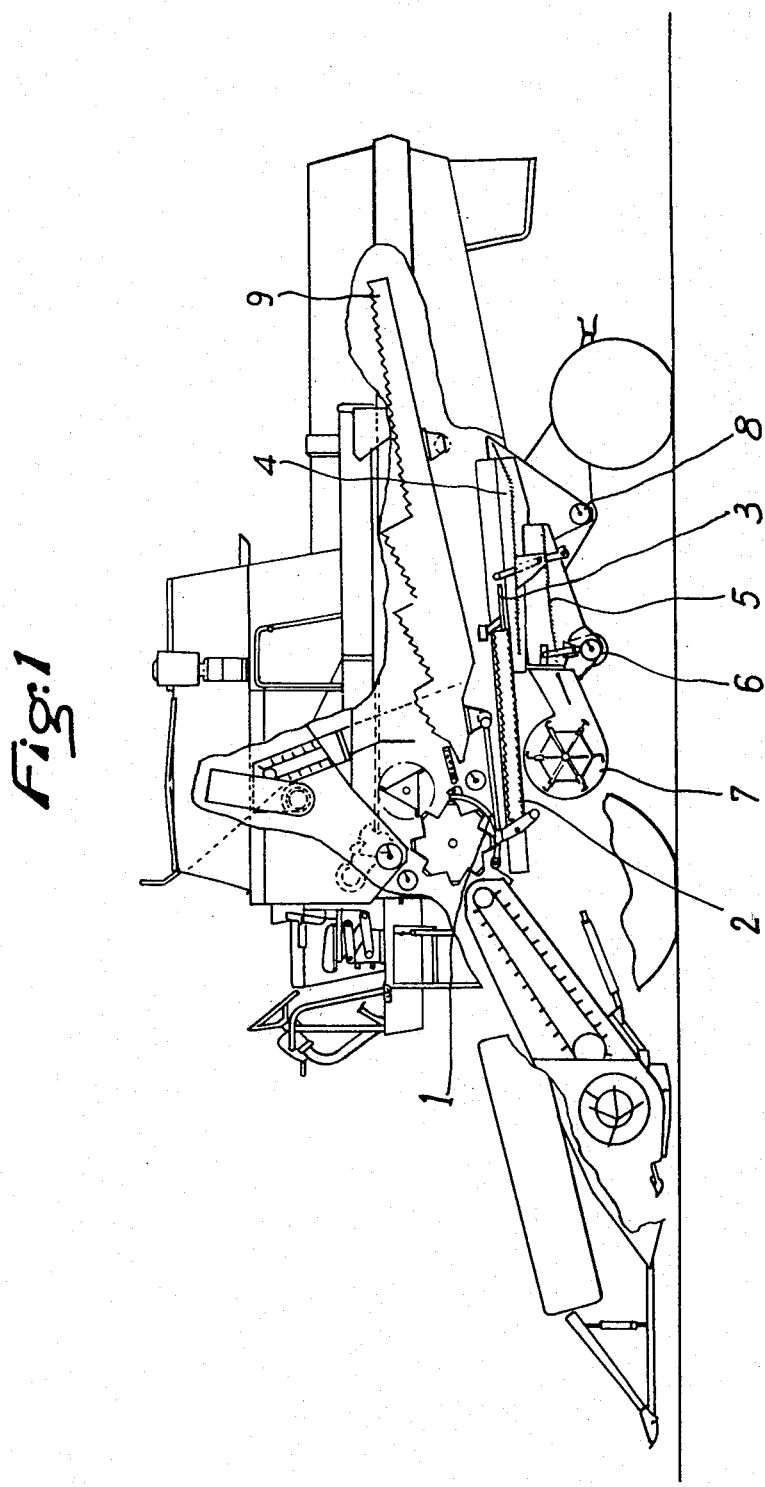
FIG. 1 shows the position of the grain-cleaning comb in accordance with the invention in a combine-harvester which is shown diagrammatically in a general vertical sectional view.
Figure 6:
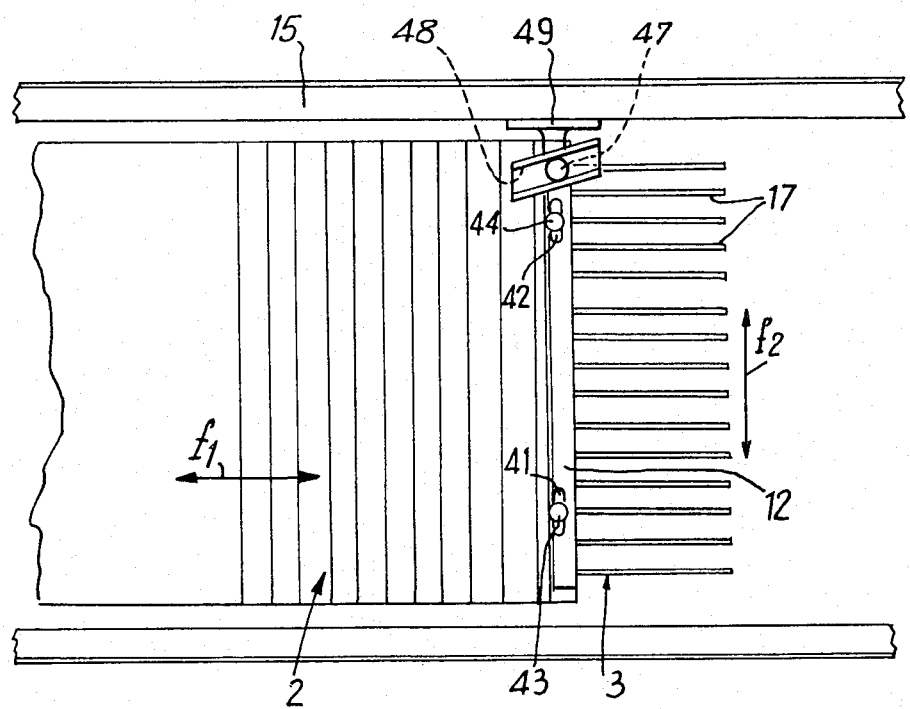
FIG. 6 is a plan view showing a first alternative mode of assembly of the comb.

In a combine-harvester of the type shown diagrammatically in the general view of FIG. 1, the threshed material, that is to say the mixture of grain and chaff, passes between the bars of a concave 1 and drops onto a shaker plate 2 which is driven in longitudinal reciprocating motion so as to cause a displacement of the material from the forward end to the rear end where the mixture of grain and chaff falls through the teeth of a comb 3, the assembly and control of which precisely form the subject of the present application. Said comb effects a distribution of the material at the moment when this latter falls onto a first cleaning sieve 4. The grain and part of the chaff pass through this first sieve and fall onto a second cleaning sieve 5 which is placed beneath the first. The grain proper is collected in a trough which is designated by the reference numeral 6. Under the action of a fan 7, the straw fragments and chaff are carried away to the rear end of the combine and discharged to the exterior. The unthreshed ears are collected in a tailings trough 8 and are returned to the feed beater by means of an elevator (not shown in the drawings). The threshed straw is carried towards the rear by means of straw walkers 9.

In FIG. 2, the mode of assembly of the cleaning comb 3 can be seen more clearly. Said comb is constituted by a body 12 (as also shown in FIG. 4) and by parallel rods 13 which are rigidly fixed on one side of said body and constitute the teeth of the comb. The comb body 12 is placed transversely very close to the rear edge of the shaker table 2 so that said body can be driven in known manner in a horizontal and longitudinal reciprocating movement in the frame 15 which carries this latter as shown by the double arrow $f1$ (FIG. 4).

The comb body 12 is supported by two longitudinal link-arms 18, 19 (as also shown in FIG. 3), the rear extremities of which are pivotally mounted on the comb body 12 by means of pins 21, 22 and the front extremities of which are pivotally mounted on the bottom face of the shaker table 2 by means of two further pins 23, 24 (as also shown in FIG. 5). The two link-arms 18, 19, the comb body 12 and the rear portion of the shaker table 2 constitute the four sides of an articulated parallelogram which serves to support the comb 3 and permits the displacement of this latter in reciprocating motion in the direction of the double arrow f2 (as shown in FIG. 4), this direction being transverse with respect to the combine and consequently with respect to the direction f1 of displacement of the shaker table which carries said comb.

The reciprocating movements of the comb 3 are controlled by means of a mechanism comprising a cam 27 which is fixed on one side of the frame 15 and against which is applied a roller 28 carried by the extremity of a rod 29 which is rigidly fixed to the pivot-pin 23, said pin being in turn rigidly fixed to the link-arm 18. The rod 29 is urged in the direction which maintains the roller 28 against the cam 27 by a spring 32, one end of which is attached to a support bracket 33 which is rigidly fixed to the frame of the combine whilst the other end of said spring is attached to a front extension 34 of the link-arm 18.

The operation is as follows:

While the shaker table 2 is driven in longitudinal and reciprocating motion in the direction of the arrow f1, the rod 29 is displaced by said table in the same movement. The result thereby achieved is that, by running against the fixed ramp 27, the roller 28 causes the rod to perform a pivotal movement while being accompanied by the link-arm 18, and that the body 12 of the comb 3 undergoes a corresponding reciprocating transverse movement in the direction of the arrow f2 at right angles to the arrow f1. The material which drops onto the comb is therefore subjected to a uniform and powerful shaking action over the entire length of the comb teeth, which is the primary object of the invention.

Figure 7:
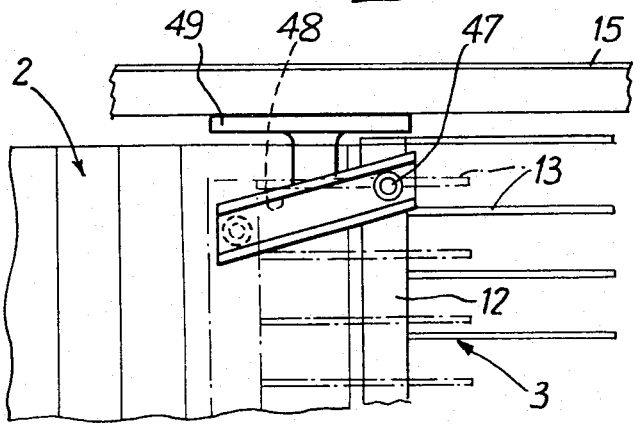
FIG. 7 is a view to a larger scale showing the comb-actuating components which are visible in the top portion of FIG. 6.

In a first alternative embodiment illustrated in FIG. 5, the body 12 of the comb 3 is slidably mounted by means of two elongated slots 41, 42 which are fitted over two screws 43, 44 carried by the rear end of the shaker table 2, the heads of said screws being intended to retain the comb body in the upward direction. One end of the comb body 12 carries a roller 47 which is engaged in a cam groove 48 (see also FIG. 7), said groove being placed in an oblique direction and rigidly fixed to a support bracket 49 which is attached to the frame 15. Thus, when the shaker table 2 carries out a reciprocating movement in the direction of the double arrow f1, the roller 47 which is carried by said table is caused to follow the oblique cam groove 48 and is accompanied by the comb body 12 in a corresponding reciprocating movement in the direction of the arrow f2 at right angles to the arrow f1.

Figure 8:
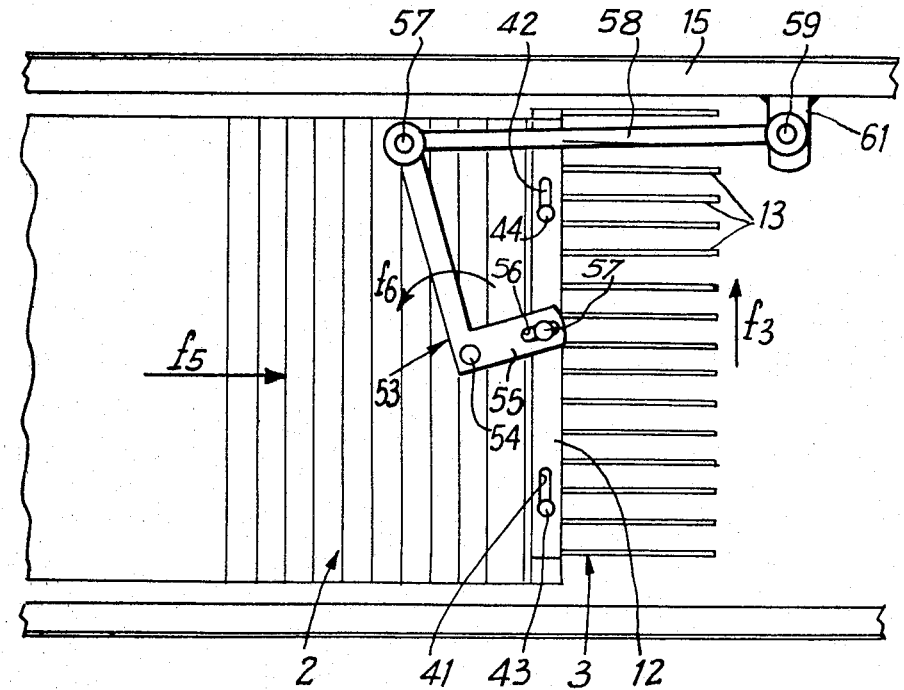
FIG. 8 is a plan view of a second alternative embodiment of comb-actuating means in one of the end positions of the comb.
Figure 9:
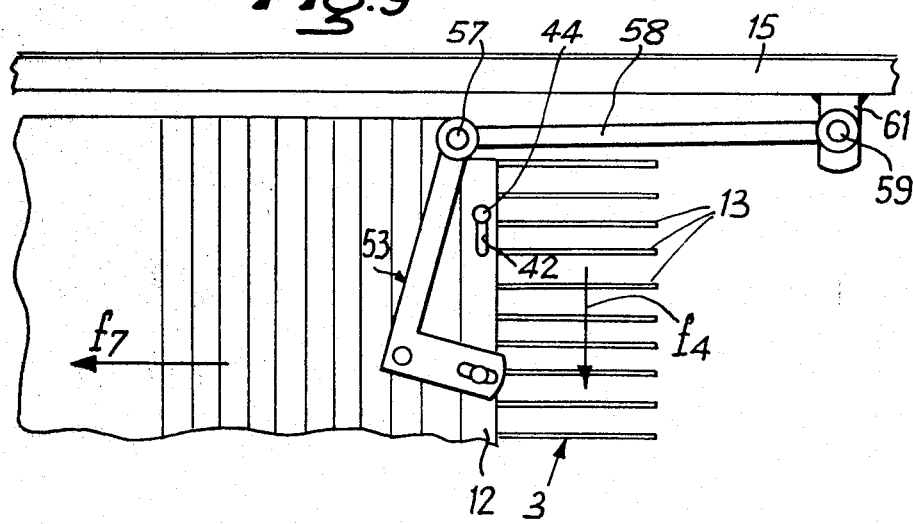
FIG. 9 is a view which is similar to FIG. 8 and shows the comb in the other end position thereof.

In a second alternative embodiment illustrated in FIG. 8 and 9, the comb body 12 is again slidably mounted on the rear end of the shaker table 2 but is subjected to a movement in the direction of the arrows f3 and f4 by means of a mechanism which is represented as a bottom view and comprises an elbowed lever 53, the apex of which is pivotally mounted beneath the shaker table 2 by means of a pin 54. The end of one of the two lever arms 55 is provided with an elongated slot 56 in which is engaged a stud 57. The end of the other lever arm 56 carries a pin 57 on which is pivotally mounted one extremity of a connecting-rod 58, the other extremity of wich is pivotally mounted by means of a pin 59 on a support bracket 61 which is attached to the frame 15. Thus, when the shaker table 2 moves in the direction of the arrow f5 (shown in FIG. 8), said table causes the elbowed lever 53 to pivot about the pin 54 in the direction of the arrow f6, with the result that the comb body 12 is displaced in the direction of the arrow f3. When the shaker table 2 moves in the opposite direction, namely in the direction of the arrow f7 (shown in FIG. 9), the movements of the different components of the mechanism are reversed and the comb moves in the direction of the arrow f4.

It is readily apparent that the invention is not limited to the embodiments which have been described with reference to the accompanying drawings and which have been given solely by way of example. Depending on the applications which are contemplated, modifications can accordingly be made therein without consequently departing either from the scope or the spirit of the invention.

We claim:

1. In a combine-harvester including a frame, a longitudinally reciprocating shaker table having a discharge edge, and a cleaning system,
   a comb device for processing grain as it passes from said discharge edge of the shaker table into the cleaning system, said comb device comprising an elongated comb body and a series of fingers protruding therefrom, said comb body coupled to said longitudinally reciprocating shaker table along said discharge edge by supporting and guiding means which cause said comb device to reciprocate longitudinally along with said shaker table and permit it to move in a transverse direction thereto.
   control means attached to said means and operatively associated with said comb body for imparting transverse movement thereto in response to longitudinal reciprocation of said shaker table.

2. A device according to claim 1, wherein said means for supporting and guiding the comb device are constituted by link-arms pivotally mounted at one extremity on the comb body and at the other extremity to said discharge edge of the shaker table.

3. A device according to claim 1, wherein said means for supporting and guiding the comb device are constituted by a transverse guide which is rigidly fixed to said discharge edge of the shaker table and on which the comb body is slidably mounted.

4. A device according to claim 1, wherein said control means are constituted by a lateral cam rigidly fixed to said frame and by a roller pivotally mounted on said comb body and which runs along said cam.

5. A device according to claim 4, wherein said cam is a grooved cam in which said roller carried by the comb body is engaged.

6. A device according to claim 1, wherein said control means are constituted by an elbowed lever made up of two lever arms joined at an apex, the apex of said elbow lever is pivotally mounted on the shaker table and the two lever arms are coupled respectively to said comb body and to said frame.

7. A device according to claim 6, wherein the coupling between the elbowed lever arm and said frame is constituted by a connecting-rod.

8. A device according to claim 6, wherein the coupling between the elbowed lever arm and the frame is constituted by a cam rigidly fixed to the frame and a roller carried by the corresponding end of the elbowed lever arm, said roller being biased into engagement with said cam by a spring.

* * * * *